July 10, 1951  R. T. CAMERON  2,560,214
BEVERAGE MAKING APPARATUS
Filed Oct. 19, 1949  2 Sheets-Sheet 2
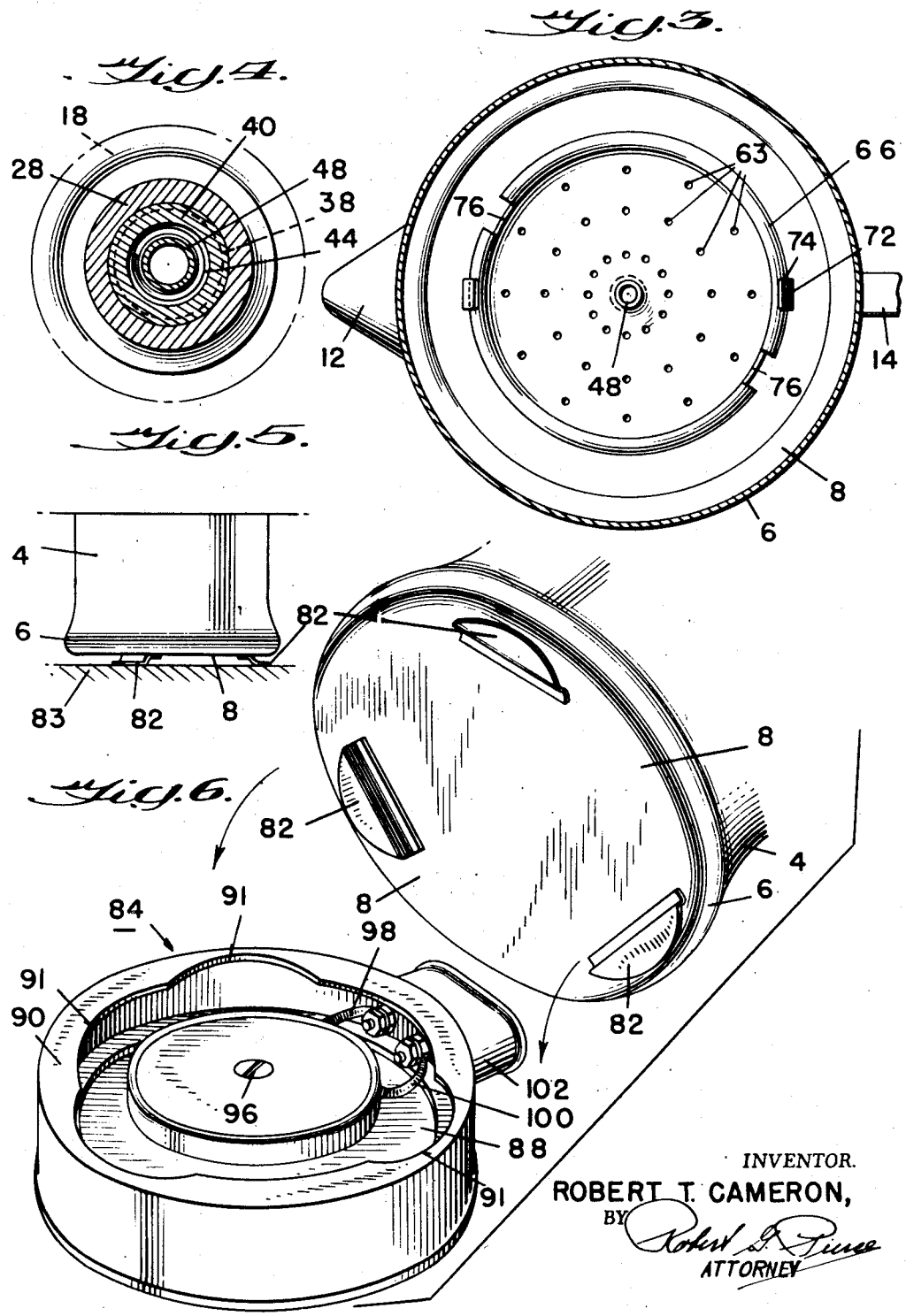
INVENTOR.
ROBERT T. CAMERON,
BY
ATTORNEY Patented July 10, 1951

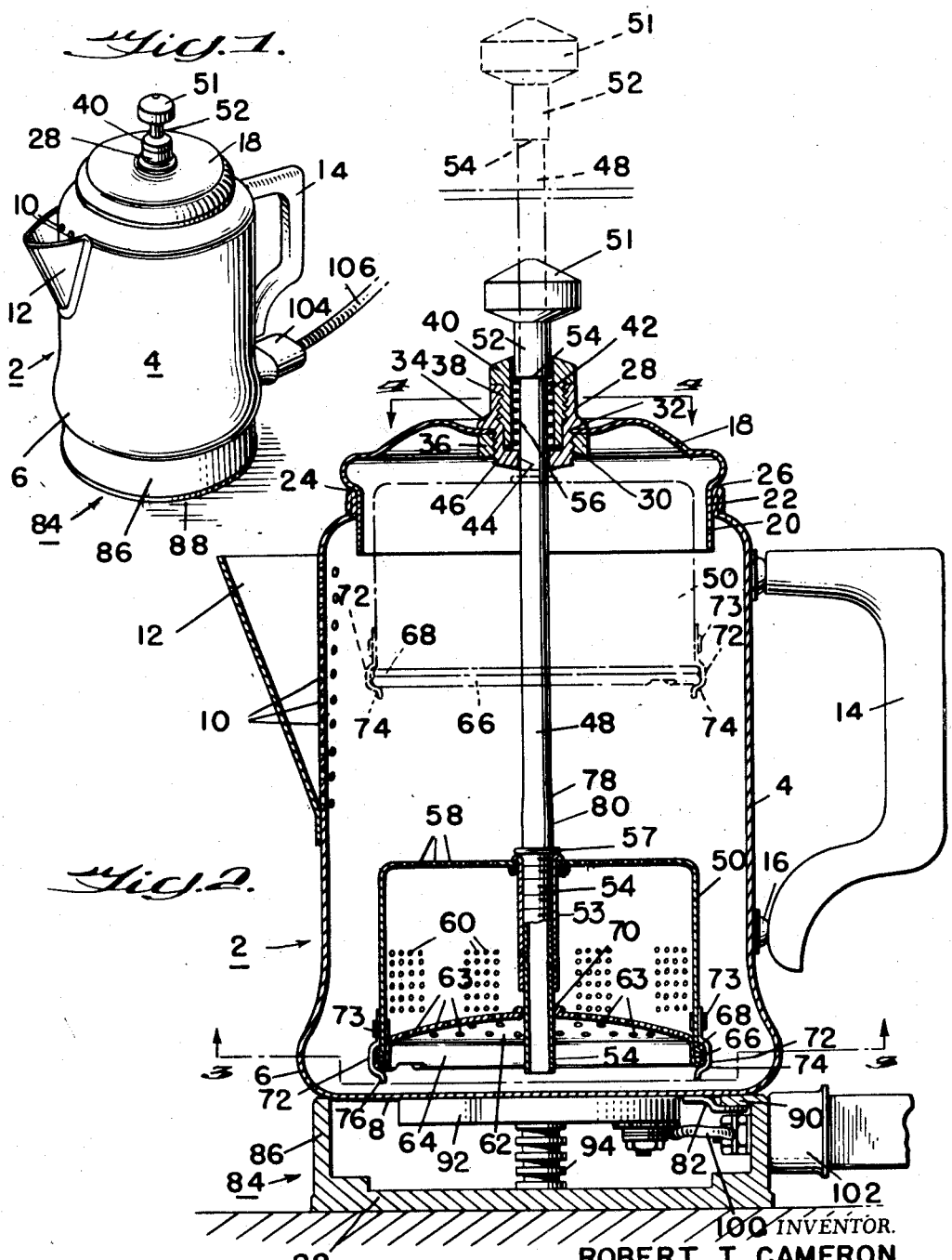

2,560,214

UNITED STATES PATENT OFFICE 2,560,214

BEVERAGE MAKING APPARATUS

Robert T. Cameron, Knoxville, Tenn.

Application October 19, 1949, Serial No. 122,317

8 Claims. (Cl. 99—319)

This invention relates to apparatus for the making of beverages, and more particularly, to apparatus especially designed for the preparation of coffee. Of fundamental significance, as will become apparent from the following specification, is the unique arrangement and disposition of the component elements of the apparatus which permit it to serve, optionally, as a kitchen or table utensil, and its ready adaptability, without conversion of parts, to the brewing of coffee by the drip, percolator or boiling processes.

As will become self-evident, one of the primary objectives of this invention is to provide apparatus of the type described including, in combination, an electrical heating element and means for detachably connecting the apparatus therewith.

Another object of this invention is to provide a coffee making urn provided with means for coupling the urn with an electric heating element, or optionally, the utilize the coupling means for supporting the urn on a grill, table top, or other substantially uniplanar surfaces.

A still further object of this invention is to provide a foraminous container for coffee, together with means for supporting the container adjacent to, or remote, from the bottom of the apparatus.

It is proposed, as a further object of the invention, to provide means for automatically reciprocating the foraminous container to provide a churning action under certain conditions.

The invention further contemplates the provision of means for supporting the foraminous container from the closure member in an elevated position relative to the bottom of the apparatus.

Other and further objects and advantages of this invention will become apparent from a reading of the following specification when considered in the light of the following drawings, in which:

Fig. 1 is a perspective view of the coffee making apparatus constructed in accordance with this invention;

Fig. 2 is an enlarged, vertical cross-section, partially in elevation, of the apparatus shown in Fig. 1;

Fig. 3 is a cross-sectional view taken on the lines 3—3 of Fig. 2;

Fig. 4 is an enlarged cross-sectional view, partially in elevation, taken on the lines 4—4 of Fig. 2;

Fig. 5 is a partial side elevation illustrating the coffee making apparatus as detached from its heating unit and supported by its coupling means on a horizontal base; and Fig. 6 is an exploded, perspective view illustrating the assembly of the coffee making apparatus with its heating element.

Referring now more specifically to the drawings, reference numeral 2 indicates, in general, a coffee maker, urn, or apparatus, constructed in accordance with the teachings of this invention. The coffee maker 2 comprises a straight, smooth, vertical side wall 4 reversely curved at 6 to continue into a bottom 8 integrally formed therewith. In accordance with conventional practices, the coffee maker 2 is provided with a series of closely grouped apertures 10 which extend through the side wall 4, embraced exteriorly by a conventional liquid pouring spout 12 which may be secured to wall 4 in any well known manner.

A handle 14 formed of heat insulating material, positioned diametrically opposite spout 12, is rigidly secured by studs or rivets 16 to the exterior of wall 4 and is supported thereby.

Coffee maker 2 is open at its upper end, the open end being provided with a concentrically convoluted closure member 18 formed with a depending flange 20 constructed of such size as to constitute a sliding fit with the interior surface 22 of the container opening. Closure member 18 is also formed with an outwardly turned shoulder 24 which engages against the rim 26 of the container opening.

As is clearly shown in Fig. 2, a hollow sleeve 28 is exteriorly threaded at its lower end 30 to be threadedly received within an aperture 32 centrally formed in closure member 18. Sleeve 28 is provided with a circumferential flange 34 which engages against the upper surface of closure member 18 to limit the downward movement of the sleeve. Look nut 36 is threaded on the lower threaded end 30 of sleeve 28 and engages against the undersurface of closure member 18 to rigidly clamp and secure sleeve 28 in its vertical position.

The upper end of hollow sleeve 28 is internally threaded to receive the threaded, lower end 38 of a bolt 40. Bolt 40 is provided with a passage 42 concentric with its longitudinal axis, the passage 42 being aligned with guide opening 44 formed in base 46 of sleeve 28.

A plunger rod 48 is mounted for vertical reciprocation within passage 42 and guide opening 44. A knob 51 is provided with a depending, integral collar 52 which engages about the upper end of shaft 48. As collar 52 is of greater diameter than shaft 48, the lower end 54 of the collar acts as an abutment for the upper end of the helicoidal spring 56 positioned within passage 42.

The lower end of spring 56 abuts against base 46 of sleeve 28.

From Fig. 2 it is seen that guide rod 48 extends downwardly into the body of the coffee maker 2, to a point adjacent to, but spaced from bottom 8. A foraminous cup-shaped container 50 is formed with centrally positioned hollow, internally threaded sleeve 53. The lower end of shaft 48 is provided with complementary threads 54 whereby container 50 may be removably secured to, and supported on, the lower end of shaft 48. Circumferential ring 57 limits the extent to which container 50 may be threaded on shaft 48.

The top and side walls of container 50 are provided with a plurality of spaced apertures 58, 60, respectively, and the container is normally supported on shaft 48 in inverted position, that is, the open end of the container 48 is disposed toward end 8.

A concave closure member 62 is provided for container 50, the closure member being provided with a plurality of apertures 63, and a depending circumferential skirt 64 slidably engaging the inner surface of container 50 adjacent its open end. Skirt 64 is formed with an outwardly turned, peripheral bead 66, which normally engages against the beaded rim 68 of container 50.

As is shown clearly in Fig. 2, closure member 62 is formed with a central aperture 70 to slidably receive the lower end of shaft 48 therethrough.

From the foregoing it is manifest that closure member 62 is removably mounted on shaft 48, and is retained thereon by locking means comprising a plurality of circumferentially spaced, spring metal lugs 72 rigidly secured to container 50 by rivets 73, the lugs depending from the lower edge of the container and formed with inwardly turned shoulders 74 adapted to engage around bead 66 of the closure member. To facilitate removal of the closure member, a plurality of spaced recesses 76 are formed in bead 66 and cooperate with lugs 72 in a manner to be described.

Immediately above circumferential ring 57, shaft 48 gradually increases in cross-section at 78 until it reaches its maximum thickness at 80. The unique purpose and function of this feature of the invention will also become apparent from the recitation which follows.

To the bottom 8 are rigidly secured a plurality of exterior, depending lugs 82 which serve, at the option of the user, as supporting standards whereby the coffee maker 2 may be maintained in an upright position on any type of suitable base 83 (see Fig. 5), or as means for locking the coffee maker to a portable heating device, indicated generally at 84.

The heating device 84 (see Figs. 2 and 6) comprises a hollow cylindrical base having side and bottom walls 86 and 88, respectively, the side wall 86 having an inwardly extending flange 90 substantially parallel to bottom wall 88. Flange 90 is formed with a plurality of notches 91 which are adapted to receive lugs 82 therethrough whereby, as the device 84 and coffee maker 2 are turned relative to each other, lugs 82 slide below flange 90 whereby coffee maker 2 is releasably secured to the heating device 84.

A conventional heating unit 92 enclosing the usual electrical resistance (not shown), is supported on bottom wall 88 by adjusting screw 94, the two being secured in position by lock screw 96.

Electrical energy is conveyed to unit 92 by leads 98, 100 which connect with the conventional female connection 102 adapted to be coupled with the male plug 104 (of conventional design) having the usual cable 106 for electrical connection with a source of E. M. F.

The advantages of the apparatus described in detail supra are deemed obvious to one skilled in the art of brewing coffee. For example, assuming that the apparatus is as shown in full lines in Fig. 2, and that ground coffee has been carefully measured and placed in container 50, water in an amount proportional to the coffee is poured into the coffee maker 2.

Assuming that it is desired to make boiled coffee, cable 106 is connected with a source of electrical current whereby the resistance of heating unit 92 is energized. Thus, the water is gradually heated to the boiling point and as it continues to boil, turbulance of the water beneath closure member 62 creates a reciprocation of container 50 and of shaft 48. Upward movement of container 50 is assisted by tension of spring 56 acting against shoulder 54 of knob 51. Downward movement is, of course, resisted as spring 56 is compressed.

The oscillatory movement of container 50 causes the boiling water to churn through the coffee, whereby the oils, essences and other compounds of the coffee are fully extracted. When the beverage has reached the desired strength, the operator grasps knob 51 and raises it. As the shaft 48 is moved upwardly, the enlarged portions 78 and 80 become wedged within aperture 44 to secure container 50 in its elevated position, as shown in Fig. 2 in broken lines. Hence, the brewed coffee may be subjected to further heating, if desired, or may be decanted.

To carry out this last operation, the operator grasps handle 14 and rotates the coffee maker to move lugs 82 into alignment with recesses 91. Lifting upwardly, the coffee maker 2 is separated from the heating device 84 whereby the liquid contents of the coffee maker may be dispensed through spout 12 in the usual manner.

Should it be desired, the water could first be brought to boil with the container 50 in its elevated position and thereafter lowered—either procedure being carried out with the greatest of facility due to the versatility of the apparatus.

After having completed the brewing operation, the cleaning of the apparatus is very simple. Closure member 18 is removed, and the now empty coffee maker may be washed in the customary manner. Thereafter, closure member 62 is rotated to bring recesses or slots 76 into alignment with lugs 72 whereby closure member 62 may be pulled away from container 50. Coffee grounds deposited within container 50 are then removed, and closure member 18, shaft 48, container 50 and its associated closure member 62 are then cleaned.

In the event more coffee is to be brewed, container 50 is inverted from the position shown in Fig. 2, coffee is then measured out and placed in the container which is then closed by closure member 62. Shaft 48 is then distended through aperture 44 or pulled up through the same to wedge portions 78 and 80 therein, depending entirely upon which of the two methods, described above, is to be employed.

Should the operator be disposed to make percolated coffee, container 50 is filled with the proper amount of coffee and is then raised to its elevated position, as shown in broken lines in Fig. 2. Water is then added to the coffee maker 2, and heating unit 92 is energized as described above. As the temperature of the water rises to the boiling point, it rises in coffee maker 2 and circulates through container 50 and the coffee therein. After a predetermined time, heating unit 92 is deenergized and the coffee dispensed.

As an optional feature, knob 51 may be detachably connected with the upper end of shaft 48 whereby the latter may be removed from within the apertured sleeve 28. This feature together with the threaded connection between container 50 and shaft 48 permits all of the elements associated with closure member 18 to be easily assembled or disassembled for transport or cleaning.

As must be apparent from the foregoing specification, the present apparatus is suitably designed for use directly at the table, or if desired, the coffee maker 2 may be detached from heating device 84 and brought to the table. In this case, lugs 82 support coffee maker 2 above the plane of the table 83 to prevent heat damage thereto.

Having described this invention in detail, it is to be understood that the present embodiment is only offered for the purposes of illustration, and that the invention is to be limited only by the scope of the following claims:

I claim:

1. Beverage making apparatus comprising a container having side and bottom walls, said container having an open end oppositely disposed with respect to said bottom wall, a centrally apertured closure member for said open end of said container, an elongated shaft mounted for reciprocation through said aperture and having an end thereof disposed within said container, a holder for beverage brewing ingredients secured on said one end of said shaft, and friction means on said shaft cooperating with said aperture for supporting said ingredient holder in adjusted position adjacent said closure member.

2. Beverage making apparatus comprising a container having side and bottom walls, said container having an open end oppositely disposed with respect to said bottom wall, a centrally apertured removable closure member for said open end of said container, a shaft mounted for reciprocation through said aperture and having one end thereof disposed within said container, a holder for beverage brewing ingredients mounted on said one end of said shaft, and said shaft having a portion thereof intermediate its ends gradually increasing in diameter and reaching a maximum diameter at a point adjacent said ingredient holder, said portion of said shaft frictionally engaging within said aperture as said one end of said shaft and said ingredient holder are moved from said bottom wall toward said closure member to retain said ingredient holder in elevated position above said bottom wall and adjacent said closure member.

3. Beverage making apparatus comprising a substantially hollow container having opposed open and closed ends, a centrally apertured closure member detachably secured on said open end of said container, an elongated shaft mounted for reciprocation through said aperture and having one end thereof disposed within said container, a holder for beverage brewing ingredients mounted on said one end of said shaft, said ingredient holder having an open end adjacent said closed end of said container, a closure member for said open end of said ingredient holder, said closure member having a concave surface oppositely disposed with respect to said closed end of said container, and friction means on said shaft cooperating with said aperture to support said ingredient holder in elevated position above said closed end of said container and adjacent said first closure member.

4. Beverage making apparatus comprising a substantially hollow container having opposed open and closed ends, a centrally apertured closure member detachably secured on said open end of said container, an elongated shaft mounted for reciprocation through said aperture and having one end thereof disposed within said container and terminating adjacent said closed end of said container, a holder for beverage making ingredients detachably mounted on said one end of said shaft and having an open end adjacent said closed end of said container, a closure member for said open end of said ingredient container, said closure member for said ingredient container having a concave surface oppositely disposed with respect to said closed end of said container, means detachably securing said last named closure member across said open end of said ingredient holder, and said shaft having friction means thereon cooperating with said aperture for supporting said ingredient holder in elevated position above said closed end of said container at a point adjacent said first named closure member.

5. In a beverage making device comprising a liquid container having opposed open and closed ends, means for heating said liquid within said container, and means detachably securing said heating means with said container, a centrally apertured closure member for said container, an elongated shaft mounted for reciprocation through said aperture and having an end thereof disposed within said container, a foraminous holder for beverage making ingredients mounted on said one end of said shaft, said ingredient holder having an open end and a closed end, a closure member for said open end of said ingredient holder, said last named closure member having a concave surface and having a plurality of perforations extending transversely therethrough, and friction means on said shaft cooperating with said aperture for supporting said ingredient holder in elevated position above said closed end of said liquid container at a point adjacent said first named closure member.

6. In a beverage making device comprising a liquid container having opposed open and closed ends, electric heating means for heating said liquid within said container and concealed means detachably securing said heating means with said container, a centrally apertured closure member for said open end of said liquid container, a shaft mounted for reciprocation through said aperture and having an end thereof disposed within said container, a foraminous holder for beverage making ingredients, said holder being threadedly mounted on said one end of said shaft, said holder having an open end and a closed end, a closure member for said open end of said holder, said last named closure member having a plurality of perforations extending transversely therethrough, and friction means on said shaft cooperating with said aperture for supporting said ingredient holder in elevated position above said closed end of said liquid container at a point adjacent said first named closure member.

7. Beverage making apparatus comprising a liquid container having opposed open and closed ends, a centrally apertured closure member detachably secured to said container and extending across said open end thereof, a shaft mounted for reciprocation through said aperture and projecting on each side of said closure member, said shaft having one of its ends disposed within said container, a holder for beverage brewing ingredients detachably connected to said one end of said shaft, said holder having an open end oppositely disposed with respect to said closed end of said container, a closure member for said open end of said holder, said last named closure member having a concave surface adjacent said closed end of said container, friction means on said shaft cooperating with said aperture to support said ingredient holder in elevated position adjacent said first closure member, and means for heating liquid within said container to its boiling point to create a turbulance of said liquid beneath said concave surface of said last named closure member whereby said shaft is reciprocated in said aperture to signal that said liquid has reached its boiling point.

8. Beverage making apparatus comprising a liquid container having opposed open and closed ends, a centrally apertured closure member detachably secured to said container and extending across said open end thereof, a shaft mounted for reciprocation through said aperture and projecting on each side of said closure member, said shaft having one of its ends disposed within said container, a holder for beverage brewing ingredients removably secured to said one end of said shaft, said holder having an open and a closed end, a closure member for said open end of said holder, friction means on said shaft cooperating with said aperture to support said ingredient holder in elevated position adjacent said first closure member, means for heating liquid in said container to its boiling point to generate a fluctuating force reacting against said last named closure member, whereby said shaft is reciprocated in said aperture to indicate to the operator that said liquid has reached its boiling point, and means detachably securing said heating means with said container, said securing means being concealed from view when said container and heating means are connected together.

ROBERT T. CAMERON.

REFERENCES CITED

The following references are of record in the file of this patent:

UNITED STATES PATENTS

| Number | Name | Date |
|---|---|---|
| 374,270 | Richards | Dec. 6, 1887 |
| 786,666 | McKenzie | Apr. 4, 1905 |
| 793,655 | Haley | July 4, 1905 |
| 1,887,848 | Peirce | Nov. 15, 1932 |
| 2,103,704 | Wygodsky | Dec. 28, 1937 |
| 2,276,216 | Lehmann | Mar. 10, 1942 |
| 2,365,615 | Woodman | Dec. 19, 1944 |

FOREIGN PATENTS

| Number | Country | Date |
|---|---|---|
| 12,145 | Germany | Jan. 12, 1881 |